Patented Sept. 21, 1948

2,449,673

UNITED STATES PATENT OFFICE 2,449,673

EXTRACTION AND ISOLATION OF DIGITOXIN

Harry Rosen, Drexel Hill, Pa., assignor to Wyeth Incorporated, Philadelphia, Pa., a corporation of Delaware No Drawing. Application August 20, 1946, Serial No. 691,873

20 Claims. (Cl. 260—210)

This invention relates to the preparation of a cardioactive glucoside and particularly relates to the extraction and isolation of the chief active glucoside of digitalis in a substantially pure and crystalline state.

Digitalis appeared in the London Pharmacopeia as far back as 1650. The drug became increasingly popular from the time Dr. Withering in 1785 demonstrated successfully and repeatedly its efficacy as a heart tonic. However, almost from the date of its introduction into medicine, physicians have complained periodically of the fact that even though control assays on freshly prepared digitalis galenicals indicated a given activity, still, after standing, the preparations could not be relied upon to produce a cardiac response in patients corresponding to the indicated given activity. As a result digitalis has been the subject of exhaustive investigation, and it is now known that various digitalis galenicals lose a considerable portion of their cardiac activity. To overcome this instability difficulty, a number of the glucosides of digitalis have been isolated and placed at the disposition of the physician. However, the preparation of glucosides, particularly digitoxin ($C_{41}H_{64}O_{13}$), in pure form and in good yield is a difficult matter since digitalis leaves contain only about .2 to .4% of very slightly water soluble digitoxin mixed with other glucosides, tannin, and ballast material.

The digitoxin ($C_{41}H_{64}O_{13}$) produced by my process is uniform in its pharmacological action, uniform in its chemical constitution, uniform crystallographically, uniform in physico-chemical tests and is uniform in its oral availability in man as shown by electro-cardiograph. As a result of its remarkable uniformity, my final product is especially valuable in that side reactions are reduced to a minimum.

One object of the present invention is to provide physicians with substantially pure, crystalline digitoxin, the chief cardio-active glucoside of digitalis.

Another object of the invention is to extract digitoxin more completely from crude sources, such as the leaves of Digitalis purpurea.

Another object of the invention is to isolate in a substantially pure, crystalline form, the digitoxin contained in extracts of digitalis.

Other objects will become apparent hereafter in the specification.

I have found that a menstruum, comprising a lower alcohol or mixture of lower alcohols and water, extracts the water-insoluble digitoxin substantially completely from digitalis leaves. By lower alcohol, I mean the $C_1$–$C_4$ alcohols, particularly methyl, ethyl or isopropyl alcohol. These may be used either singly or in admixture. The alcoholic concentration suitable for use ranges from 50% lower alcohol or alcohols, the remainder being water, to about 95% alcohol or alcohols, although it is preferred that the menstruum comprise a major amount of lower alcohol or alcohols and a minor amount of water. More preferably, denatured ethyl alcohol can be used when the denaturant is present in minor amount and is such that it would not react with the desired digitoxin; and more preferably still, because of relative cost, a denatured ethyl alcohol with methyl alcohol as the denaturant, made up in an ethyl to methyl alcohol ratio by volume of about 10:1, can be used. The alcohol is preferably mixed with water on the basis of about 60% by volume of alcohol and about 40% water.

I have further found that the tannins and inert extractive materials are removed without precipitation of digitoxin by treatment of the extract with compounds of such bivalent metals as lead, iron, copper, tin and chromium in the form of their acetates, chlorides or carbonates or their basic salts. These compounds may be used either in solid form as aqueous suspensions or in solution, of a concentration exceeding 30% by weight. Among the compounds tested, I have found ferrous and lead acetate to be particularly suitable with the latter more particularly preferred.

I have also ascertained that any contaminating glucoside, such as gitalin, that may have carried through in traces from the extraction and treatment with the acetate, may be removed by taking up the concentrated extract of digitoxin in a water-immiscible organic solvent and washing the solution with water or a very dilute alkaline solution, preferably the latter. When using dilute alkaline solutions, alkali metal hydroxides or carbonates, preferably sodium carbonate or dilute ammonium hydroxide is used.

For further purification, the digitoxin is precipitated at least once from a water-immiscible organic solvent with petroleum ether and recrystallized at least once from an aqueous alcoholic medium.

To promote a better understanding of my invention, typical methods of practicing the process of my invention are set forth in the following examples, which are not to be considered limitative but are disclosed for illustrative purposes only.

Example I

One thousand grams of ground digitalis leaves were moistened thoroughly with a menstruum consisting of 60% ethyl alcohol and 40% water and were packed in a percolator with enough of the menstruum to leave a stratum above the drug. After maceration overnight, the drug was percolated with about 7 liters of the 60%-alcohol menstruum and about 5 liters of percolate or extract were collected. Four hundred grams of solid lead acetate were added to the percolate and the mixture was stirred until all the lead acetate had dissolved. After standing for at least one hour, the copious light green precipitate was centrifuged off and washed successively with 1000 cc. and 500 cc. portions of 60% alcohol. The washings were combined with the filtrate from the centrifuge and most of the excess lead acetate removed by treatment with a saturated solution of sodium carbonate monohydrate. The resulting lead carbonate was filtered off, washed with two 200 cc. portions of 60% ethyl alcohol, and the washings combined with the filtrate. Hydrogen sulfide was then passed through the combined liquids until no more lead sulfide precipitated. The filtrate and washings resulting from filtering off the lead sulfide were concentrated in vacuo at or below 40° C. to a volume of 2000 cc. and saturated with a salt, such as sodium chloride, to facilitate subsequent extraction with a water-immiscible organic solvent. The mixture was extracted five times with 600 cc. of a solvent consisting of two volumes of chloroform and three volumes of amyl ether. The chloroform-amyl ether solution is extracted with about four 400 cc. portions of a 10% solution of sodium carbonate monohydrate to remove any gitalin that may have carried through in the process and vegetative extractive material. After drying over anhydrous sodium sulfate and filtering, the chloroform-amyl ether solution was concentrated in vacuo at 75–85° C. to a volume of about 25 cc. After cooling to room temperature, the concentrate was mixed with about four volumes of petroleum ether and allowed to stand for about one hour at room temperature. The dark colored, amorphous precipitate was filtered and washed with petroleum ether to ensure that all fat had been removed. The precipitate was dissolved in 100 cc. of dilute alcohol (1:1) and the slight precipitate remaining after thorough agitation was filtered off. The filtrate was made slightly alkaline with 10% ammonia water and 10 grams of solid lead acetate were dissolved therein with agitation. The light brown precipitate which formed, was centrifuged off and washed with two 50 cc. portions of dilute alcohol. Excess lead acetate was removed by passage of hydrogen sulfide through the solution until no more lead sulfide precipitated. The filtrate and washings resulting from removal of the lead sulfide was concentrated below 40° C. After making slightly alkaline with ammonia water, the concentrate was extracted with three 50 cc. portions of chloroform. The chloroform extract of digitoxin was dried over anhydrous sodium sulfate. After filtering and washing the filter with dry chloroform, the chloroform extract was heated on a water bath to remove the chloroform and the residue was dissolved in 20 cc. of hot alcohol at about 60° C., and diluted with hot distilled water at 60° C. to an alcohol concentration of 30%. Upon standing overnight, the digitoxin settled out as a yellowish orange, mostly amorphous solid together with some needle and rosette crystals. The digitoxin was filtered off, and dried in a vacuum desiccator over calcium chloride and then was dissolved in 10 cc. of dry chloroform after which 15 cc. of dry amyl ether was added, followed by 100 cc. of petroleum ether. After standing one hour, the precipitate was filtered off, washed with petroleum ether, and dried in a vacuum desiccator until all traces of amyl ether were removed. One cubic centimeter of alcohol for each 25 milligrams of material was added to the dried precipitate and the mixture was heated on a water-bath at 60° C. until the precipitate had completely dissolved, after which hot distilled water at 60° C. was added to produce an alcohol concentration of 40%. Upon standing overnight at room temperature the digitoxin came down as almost completely white crystals. Upon recrystallizing a second time from 40% alcohol, completely white crystals of digitoxin were obtained. On the basis of the digitalis cat assay, the digitoxin was completely pure and is a prompt and powerful heart tonic in doses of .25 mg. to 1 mg. The crystalline digitoxin is also substantially stable and may be relied upon by the physician to furnish a uniform degree of activity of the same kind insofar as the digitoxin is concerned.

Example II

Starting with 10 kilograms of the leaves of *Digitalis purpurea*, this material was extracted with 70 liters of Standard Denatured Alcohol #30 comprising about 10 volumes of ethyl alcohol and about one volume of methyl alcohol in the form of an aqueous solution comprising 60% alcohol and 40% water. Sufficient lead acetate was added to precipitate tannins, ballast and vegetative extractive material. The precipitate was discarded and the clear solution was treated with H2S to remove the lead salts. The lead sulfide was removed and the solution was concentrated to remove alcohol. The mixture was extracted with five 6-liter portions of diethyl ether. The ether solution was extracted with a 1% solution of sodium carbonate to remove gitalin and all traces of the carbonate solution was removed by treatment with sodium sulfate and filtering. The ether solution was then distilled to remove substantially all ether leaving a substantially solid residue. The residue was dissolved in a small amount of chloroform, 5 volumes of petroleum ether was added and the mixture was allowed to stand overnight. The precipitate formed was filtered and dried. This precipitate was dissolved in dilute S. D. A. #30 (a 50% aqueous solution), made slightly alkaline with 10% ammonia and lead acetate was again added. The precipitate was removed and H2S added to the clear solution. The lead sulfide was precipitated and removed and the filtrate was then concentrated. The concentrate was extracted with chloroform, and the extract was dried by the addition of anhydrous sodium sulfate. The mixture was filtered and the filtrate was distilled to dryness to remove the chloroform. The residue was washed with a small quantity of ether, filtered and dried. The solids were dissolved in hot, 95% ethyl alcohol, the solution was diluted with hot water to an alcoholic concentration of 40% and was permitted to stand overnight. The final, desired product precipitated out as crystals of digitoxin which were filtered, washed and dried.

Obviously, various modifications of the process may be made without departure from the spirit of the invention. Thus, a mixture of alcohols such as mixtures of ethyl alcohol with methyl and/or isopropyl alcohol may be used satisfactorily, or any of the lower alcohols in admixture with water; the latter present in minor amount, has given satisfactory results. Moreover, it is not necessary that a 60:40 ratio be used although this has been found to give exceptionally good results. One may use from 50-95% alcohol as indicated hereinabove. Furthermore, other salts capable in suitable concentrations of precipitating tannins and inert plant extractive materials without precipitating digitoxin may be used as already disclosed. Likewise in the step of washing with water, preferably containing some sodium carbonate, the chloroform-amyl ether solvent may be replaced with other water-immiscible organic solvents, such as chloroform-amyl alcohol, diethyl ether, chloroform-diisopropyl ether, hot benzene and the like that dissolve the digitoxin while dissolving slightly, if any, vegetative extractive material.

This application is a continuation-in-part of my application Serial No. 524,805 filed March 2, 1944, now abandoned.

I claim:

1. In a process for the extraction and isolation of substantially pure crystalline digitoxin from crude sources, the steps comprising extracting digitalis leaves with a mixture comprising a major amount of a lower alcohol and a minor amount of water, in which mixture digitoxin is soluble, treating the resulting liquid extract containing dissolved digitoxin with a tannin- and extractive-precipitant in a concentration sufficient to precipitate tannins, ballast and vegetative extractive materials but insufficient to precipitate digitoxin, removing the precipitated materials and excess precipitant, and recovering substantially pure crystalline digitoxin from the treated liquid.

2. In a process for the extraction and isolation of substantially pure crystalline digitoxin from *Digitalis purpurea,* the steps comprising extracting the leaves of *Digitalis purpurea* with a mixture comprising a major amount of a lower alcohol and a minor amount of water, in which mixture the digitoxin is soluble, treating the resulting liquid extract containing dissolved digitoxin to separate the digitoxin from tannins, ballast and inert material, recovering and purifying the digitoxin-containing material to obtain substantially pure crystalline digitoxin therefrom.

3. In a process for the extraction and isolation of substantially pure crystalline digitoxin from crude sources, the steps comprising extracting digitalis leaves with a mixture comprising a major amount of ethyl alcohol and a minor amount of water, treating the resulting aqueous alcoholic extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, and recovering substantially pure crystalline digitoxin from the treated aqueous alcoholic liquid.

4. In a process for the extraction and isolation of substantially pure crystalline digitoxin from crude sources, the steps comprising extracting digitalis leaves with a mixture comprising a major amount of ethyl alcohol and a minor amount of water, treating the resulting aqueous alcoholic extract containing dissolved digitoxin with lead acetate in a concentration sufficient to precipitate tannins, ballast and vegetative extractive materials but insufficient to precipitate digitoxin, removing the precipitated materials and excess lead acetate, and recovering substantially pure crystalline digitoxin from the treated aqueous alcoholic liquid.

5. In a process for the extraction and isolation of substantially pure crystalline digitoxin from crude sources, the steps comprising extracting digitalis leaves with a mixture comprising a major amount of a lower alcohol and a minor amount of water, in which mixture digitoxin is soluble, treating the resulting liquid extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, transferring the digitoxin into a water-immiscible organic solvent which dissolves digitoxin while dissolving little if any vegetative extractive material, treating the water-immiscible organic solution with water to remove any traces of gitalin, and selectively precipitating digitoxin from the water-immiscible organic solution.

6. In a process for the extraction and isolation of substantially pure crystalline digitoxin from crude sources, the steps comprising extracting digitalis leaves with a mixture comprising a major amount of ethyl alcohol and a minor amount of water, treating the resulting aqueous alcoholic extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, transferring the digitoxin into a water-immiscible organic solvent which dissolves digitoxin while dissolving little if any vegetative extractive material, treating the water-immiscible organic solution with water to remove any traces of gitalin, and selectively precipitating the digitoxin from the water-immiscible organic solution.

7. In a process for the extraction and isolation of substantially pure crystalline digitoxin from crude sources, the steps comprising extracting digitalis leaves with a mixture comprising a major amount of ethyl alcohol and a minor amount of water, treating the resulting aqueous alcoholic extract containing dissolved digitoxin with lead acetate in a concentration sufficient to precipitate tannins, ballast and vegetative extractive materials but insufficient to precipitate digitoxin, removing the precipitated materials and excess lead acetate, transferring the digitoxin into a water-immiscible organic solvent which dissolves digitoxin while dissolving little if any vegetative extractive material, treating the water-immiscible organic solution with water to remove any traces of gitalin, and selectively precipitating digitoxin from the water-immiscible organic solution with petroleum ether.

8. In a process for the extraction and isolation of substantially pure crystalline digitoxin from crude sources, the steps comprising extracting digitalis leaves with a mixture comprising a major amount of a lower alcohol and a minor amount of water, in which mixture digitoxin is soluble, treating the resulting liquid extract containing dissolved digitoxin with a tannin- and extractive-precipitant in a concentration sufficient to precipitate tannins, ballast and vegetative extractive materials but insufficient to precipitate digitoxin, removing the precipitated materials and excess precipitant, transferring the digitoxin into a water-immiscible organic solvent which dissolves digitoxin while dissolving little if any vegetative extractive material, treating the water-immiscible organic solvent with water to remove any traces of gitalin, selectively precipitating the digitoxin from the water-immiscible organic solution, and recrystallizing the digitoxin at least once from an aqueous alcoholic medium to obtain a substantially pure crystalline product.

9. In a process for the extraction and isolation of digitoxin from crude sources, the steps comprising extracting digitalis leaves with a mixture comprising a major amount of ethyl alcohol and a minor amount of water, treating the resulting aqueous alcoholic extract containing dissolved digitoxin with an acetate selected from the group consisting of lead acetate and ferous acetate, in a concentration sufficient to precipitate tannins, ballast and vegetative extractive materials but insufficient to precipitate digitoxin, removing the precipitated materials and excess acetate, transferring the digitoxin into a water-immiscible organic solvent which dissolves digitoxin while dissolving little if any vegetative extractive material, treating the water-immiscible organic solvent with water to remove any traces of gitalin, precipitating the digitoxin from the water-immiscible organic solution with petroleum ether, and recrystallizing the digitoxin at least once from an aqueous alcoholic medium to obtain a susbtantially pure crystalline product.

10. In a process for the extraction and isolation of susbtantially pure crystalline digitoxin from crude sources, the steps comprising extracting digitalis leaves with a mixture comprising a major amount of a lower alcohol and a minor amount of water, in which mixture digitoxin is soluble, treating the resulting liquid extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, transferring the digitoxin into a water-immisible organic solvent which dissolves digitoxin while dissolving little if any vegetative extractive material, treating the water-immiscible organic solution with a mildly alkaline aqueous solution to remove any traces of gitalin, and selectively precipitating digitoxin from the water-immiscible organic solution.

11. The process of claim 10, wherein the mildly alkaline aqueous solution is a dilute aqueous solution of sodium carbonate.

12. The process of claim 9, wherein the aqueous alcoholic medium comprises about 40% alcohol and about 60% water.

13. In a process for the extraction and isolation of substantially pure crystalline digitoxin from crude sources, the steps comprising extracting digitalis leaves with a mixture comprising about 60% ethyl alcohol and about 40% water, treating the resulting aqueous alcoholic extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, and recovering substantially pure crystalline digitoxin from the treated aqueous alcoholic liquid.

14. In a process for the extraction and isolation of substantially pure crystalline digitoxin from crude sources, the steps comprising extracting digitalis leaves with a mixture comprising about 60% ethyl alcohol and about 40% water, treating the resulting aqueous alcoholic extract containing dissolved digitoxin with lead acetate in a concentration sufficient to precipitate tannins, ballast and vegetative extractive materials but insufficient to precipitate digitoxin, removing the precipitated materials and excess lead acetate, and recovering substantially pure crystalline digitoxin from the treated aqueous alcoholic liquid.

15. In a process for the extraction and isolation of substantially pure crystalline digitoxin from crude sources, the steps comprising extracting digitalis leaves with a mixture comprising about 60% of a water-soluble alcohol and about 40% water, in which mixture digitoxin is soluble, treating the resulting liquid extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, transferring the digitoxin into a water-immiscible organic solvent which dissolves digitoxin while dissolving little if any vegetative extractive material, treating the water-immiscible organic solution with water to remove any traces of gitalin, and selectively precipitating digitoxin from the water-immiscible organic solution.

16. In a process for the extraction and isolation of substantially pure crystalline digitoxin from crude sources, the steps comprising extracting digitalis leaves with a mixture comprising about 60% ethyl alcohol and about 40% water, treating the resulting aqueous alcoholic extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, transferring the digitoxin into a water-immiscible organic solvent which dissolves digitoxin while dissolving little if any vegetative extractive material, treating the water-immiscible organic solution with water to remove any traces of gitalin, and selectively precipitating the digitoxin from the water-immiscible organic solution.

17. In a process for the extraction and isolation of substantially pure crystalline digitoxin from crude sources, the steps comprising extracting digitalis leaves with a mixture comprising about 60% ethyl alcohol and about 40% water, treating the resulting aqueous alcoholic extract containing dissolved digitoxin with lead acetate in a concentration sufficient to precipitate tannins, ballast and vegetative extractive materials but insufficient to precipitate digitoxin, removing the precipitated materials and excess lead acetate, transferring the digitoxin into a water-immiscible organic solvent which dissolves digitoxin while dissolving little if any vegetative extractive material, treating the water-immiscible organic solution with water to remove any traces of gitalin, and selectively precipitating digitoxin from the water-immiscible organic solution with petroleum ether.

18. In a process for the extraction and isolation of substantially pure crystalline digitoxin from crude sources, the steps comprising extracting digitalis leaves with a mixture comprising about 60% of a water-soluble alcohol and about 40% water, in which mixture digitoxin is soluble, treating the resulting liquid extract containing dissolved digitoxin with a tannin- and extractive-precipitant in a concentration sufficient to precipitate tannins, ballast and vegetative extractive materials but insufficient to precipitate digitoxin, removing the precipitated materials and excess precipitant, transferring the digitoxin into a water-immiscible organic solvent which dissolves digitoxin while dissolving little if any vegetative extractive material, treating the water-immiscible organic solvent with water to remove any traces of gitalin, selectively precipitating the digitoxin from the water-immiscible organic solution, and recrystallizing the digitoxin at least once from an aqueous alcoholic medium to obtain a substantially pure crystalline product.

19. In a process for the extraction and isolation of digitoxin from crude sources, the steps comprising extracting digitalis leaves with a mixture comprising about 60% ethyl alcohol and about 40% water, treating the resulting aqueous alcoholic extract containing dissolved digitoxin with an acetate selected from the group consisting of lead acetate and ferrous acetate, in a concentration sufficient to precipitate tannins, ballast and vegetative extractive materials but insufficient to precipitate digitoxin, removing the precipitated materials and excess acetate, transferring the digitoxin into a water-immiscible organic solvent which dissolves digitoxin while dissolving little if any vegetative extractive material, treating the water-immiscible organic solvent with water to remove any traces of gitalin, precipitating the digitoxin from the water-immiscible organic solution with petroleum ether, and recrystallizing the digitoxin at least once from an aqueous alcoholic medium to obtain a substantially pure crystalline product.

20. In a process for the extraction and isolation of substantially pure crystalline digitoxin from crude sources, the steps comprising extracting digitalis leaves with aqueous 60% ethyl alcohol, treating the resulting aqueous alcoholic extract containing dissolved digitoxin with lead acetate in a concentration sufficient to precipitate tannins, ballast and vegetative extractive materials but insufficient to precipitate digitoxin, removing the precipitated materials and excess lead acetate, transferring the digitoxin into a water-immiscible organic solvent comprising chloroform and amyl ether, precipitating the digitoxin from the water-immiscible organic solution with petroleum ether, and recrystallizing the digitoxin at least once from an aqueous alcoholic medium to obtain a substantially pure crystalline product.

HARRY ROSEN.

REFERENCES CITED

The following references are of record in the file of this patent:

UNITED STATES PATENTS

| Number | Name | Date |
|---|---|---|
| 1,898,199 | Mannich | Feb. 21, 1933 |
| 1,923,238 | Straub | Aug. 22, 1933 |